April 15, 1952 W. H. HENDRICK 2,593,028
TRACTOR CULTIVATOR
Filed Oct. 25, 1949 4 Sheets-Sheet 1
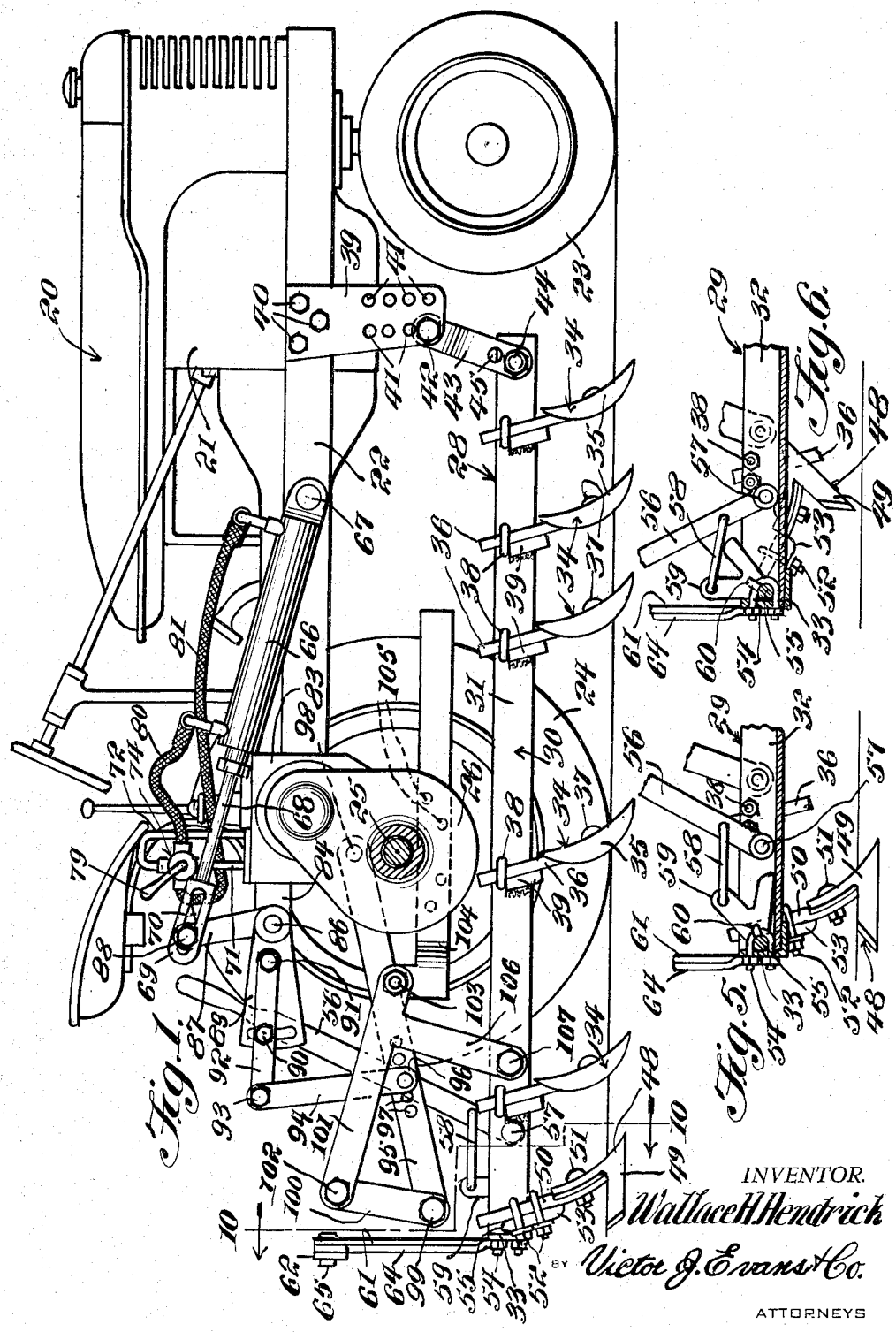
INVENTOR.
Wallace H. Hendrick
BY Victor J. Evans & Co.
ATTORNEYS

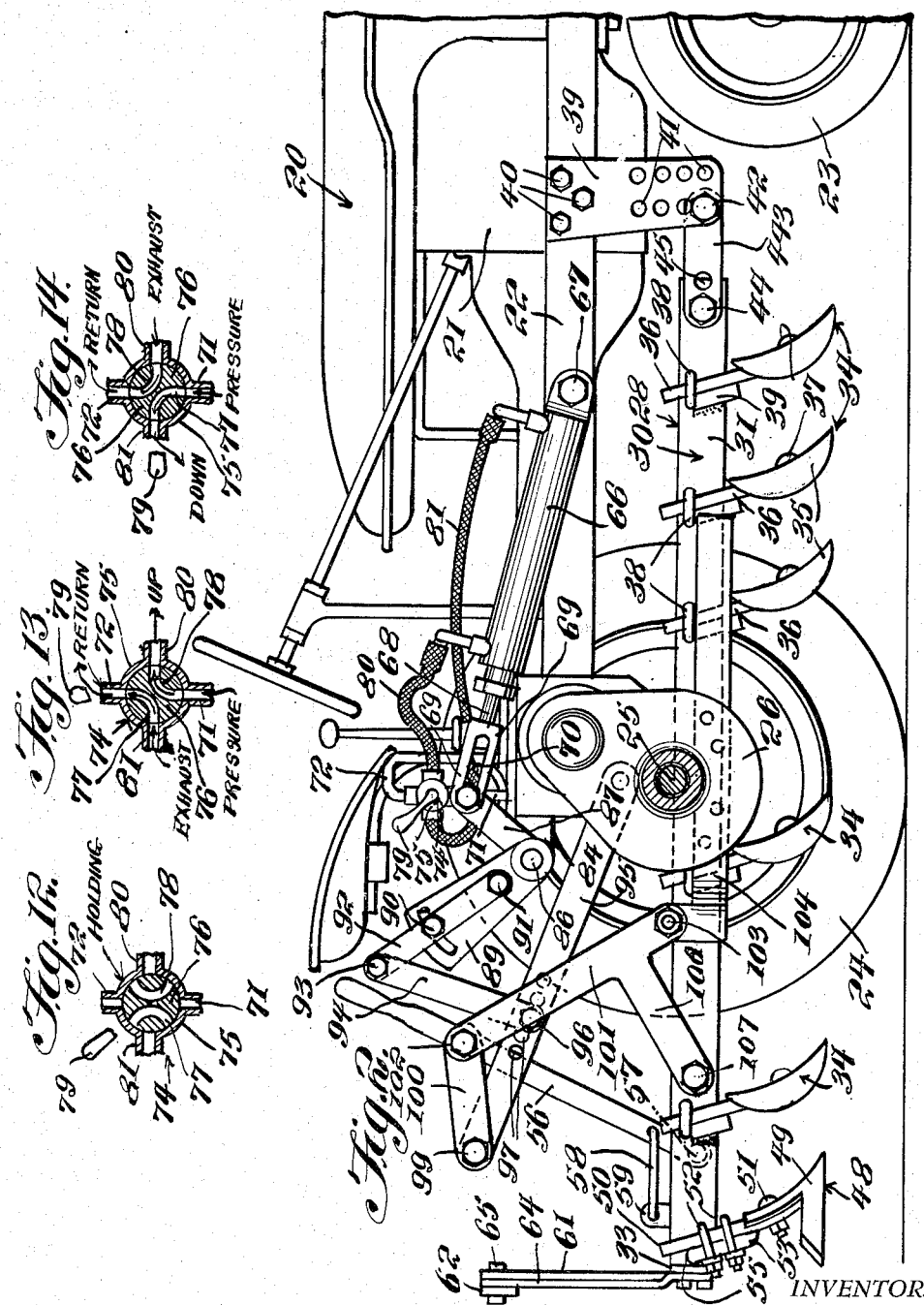

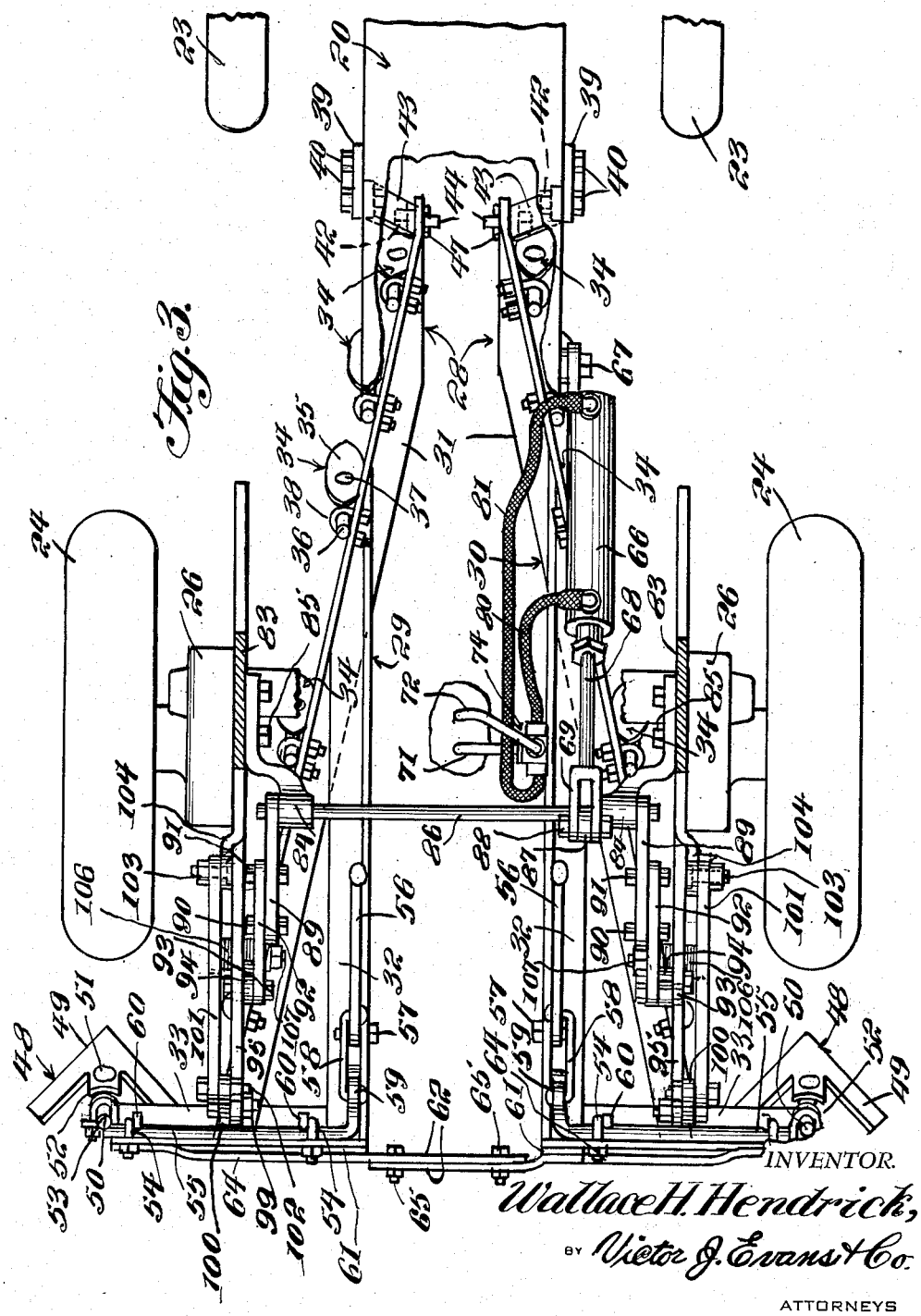

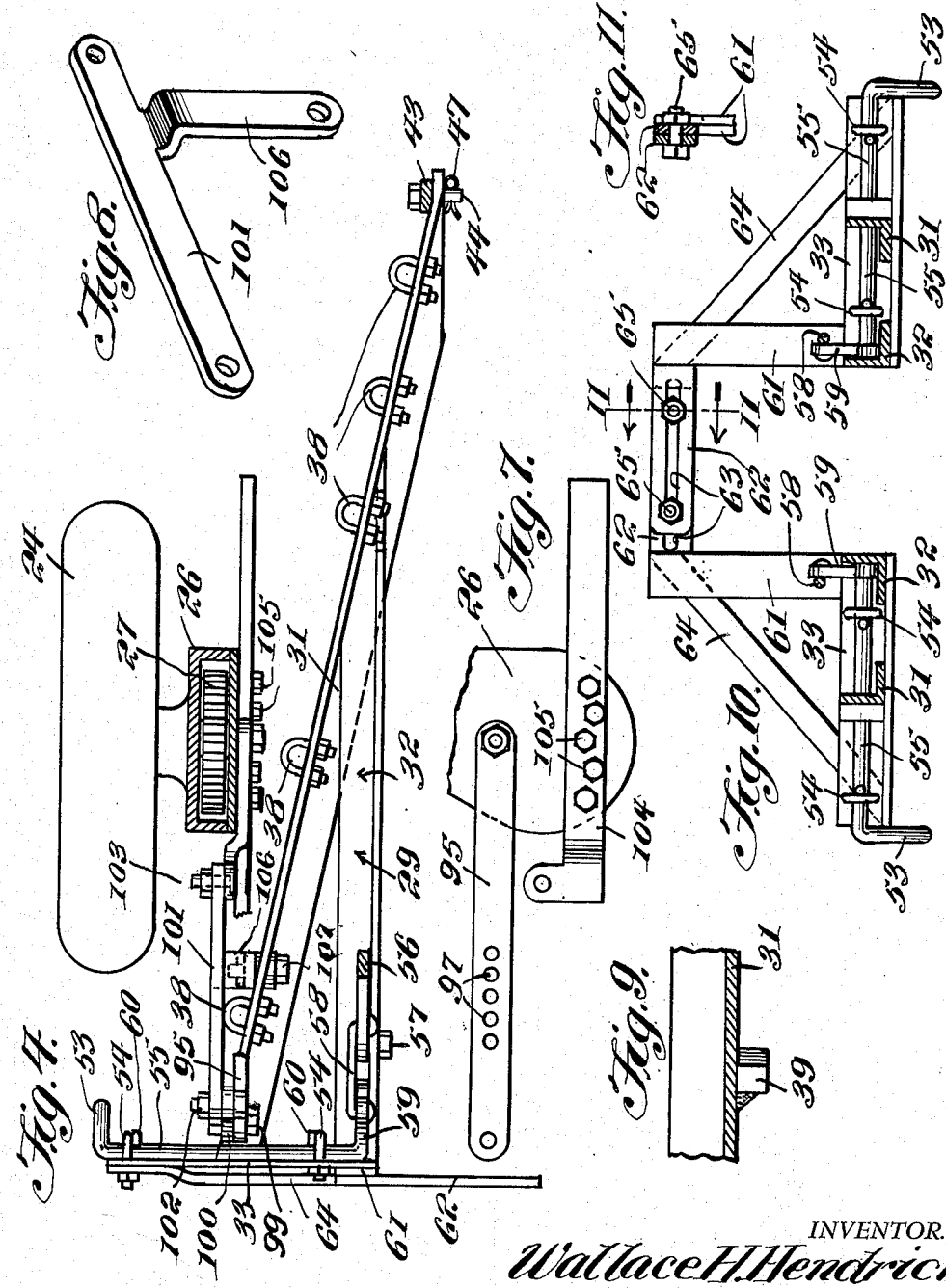

Patented Apr. 15, 1952

2,593,028

UNITED STATES PATENT OFFICE 2,593,028

TRACTOR CULTIVATOR

Wallace H. Hendrick, Cameron, N. C.

Application October 25, 1949, Serial No. 123,467

3 Claims. (Cl. 97—50)

This invention relates to agricultural equipment, and more particularly to a cultivator for attachment to a tractor.

The object of the invention is to provide a cultivator which is adapted to be detachably connected to a tractor whereby the cultivator can be readily removed from or attached to the tractor as desired.

Another object of the invention is to provide a tractor cultivator which can be raised or lowered by the tractor hydraulic system under control of the tractor operator, whereby the depth of cultivation by the shovels or plows can be varied as desired, there being a manually-operable means for independently raising and lowering the rear sweep shovels.

Still another object of the invention is to provide a tractor cultivator whose parts can be adjusted in order to permit use of the cultivator under varying field conditions.

Still another object of the invention is to provide a tractor cultivator which includes a novel mechanism for lifting the various shovels and plow so that the cultivator can be adjusted to any desired ridge or row depth.

A further object of the invention is to provide a tractor cultivator which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the tractor having the cultivator of the present invention attached thereto, the right rear wheel of the tractor being removed, and parts being broken away and shown in section;

Figure 2 is a view similar to Figure 1, but with the cultivator in its raised position;

Figure 3 is a fragmentary top plan view of the tractor, with the cultivator of the present invention attached thereto, and with parts broken away and in section;

Figure 4 is a horizonal longitudinal sectional view showing certain constructional details of the cultivator;

Figure 5 is a fragmentary side elevational view showing one of the rear sweep shovels in its lowered position;

Figure 6 is a view similar to Figure 5, but showing the sweep shovel in its raised position;

Figure 7 is a fragmentary side elevational view showing part of the mechanism for connecting the cultivator to the tractor;

Figure 8 is a perspective view of a body member for the tractor;

Figure 9 is a fragmentary sectional view showing the connection of one of the plows to the frame;

Figure 10 is a sectional view taken on the line 10—10 of Figure 1;

Figure 11 is a sectional view taken on the line 11—11 of Figure 10;

Figures 12, 13 and 14 are sectional views showing various positions of the control valve.

Referring in detail to the drawings, the numeral 20 designates a conventional tractor which is provided with an engine 21 and horizontally-disposed side members 22. The tractor 20 further includes a pair of front wheels 23 and a pair of large rear wheels 24 which are connected together by a horizontally-disposed axle 25. A suitable gear box 26 is arranged adjacent each of the rear wheels 24, the box 26 having the usual gears 27, Figure 4, arranged therein, whereby the tractor engine 21 rotates the axle 25 to thereby turn the wheels 24 so as to propel the tractor 20.

The present invention is directed to a cultivator which is adapted to be attached to the tractor 20, and the cultivator is adapted to be adjusted so as to permit the use of the cultivator under varying field conditions, the cultivator including a means for moving the various shovels and plow into and out of engagement with the ground as desired. The cultivator of the present invention includes a frame 28 which is disposed normally below the tractor during use, the frame 28 including a pair of identical sections 29 and 30.

Each of the sections 29 and 30 includes an elongated arm 31 which has a brace 32 secured thereto, as by welding. Arranged at right angles with respect to the rear end of the brace 32 is a horizontally-disposed bar 33, the bar 33 being secured to the rear end of the arm 31 and to the rear end of the brace 32. Dependingly carried by each of the arms 31 is a plurality of spaced plows 34. Each of the plows 34 includes a ground engaging element 35 that is secured to a shank 36 by bolts 37. The shank 36 is secured to the arm 31 by suitable U-bolts 38. The block 39, Figures 1, 2 and 9, is secured to the arm 31 and the block 39 abuts the shank 36 so as to prevent accidental movement of the plow 34 relative to the arm 31.

For connecting the front end of the cultivator to the tractor 20, a plate 39 is secured to the side members 22 by bolt and nut assemblies 40. The plate 39 is provided with a plurality of spaced openings 41 and a pin 42 extends through the upper end of a link 43 and into one of the openings 41, the pin 42 providing a pivotal connection between the link 43 and the plate 39. A pin 44 extends through one of a pair of openings 45 in the other end of the link 43 and the pin 44 also extends through the front end of the arm 31 so as to pivotally connect the front end of the sections 29 and 30 to the link 43 and a cotter pin 47 serves to maintain the parts in assembled relation.

Mounted on the rear end of each of the extensions 29 and 30 is a sweep shovel 48. The sweep shovels 48 are adapted to be manually and independently raised and lowered so that the tractor operator can avoid the necessity of running middles out twice. Each of the sweep shovels 48 includes a V-shaped, ground-engaging element 49 that is secured to the lower end of a shank 50 by bolt-and-nut assemblies 51, Figure 5. A plurality of U-bolt assemblies 54 rotatably connect a suitable rod 55 to the bar 33. One end of the bar 55 is arranged at right angles with respect to the main portion thereof, and this end portion is designated by the numeral 53. Suitable U-bolt assemblies 52 serve to connect the shanks 50 to the portion 53 of the rod 55, so that as the rod 55 is rotated, the shovel 48 will be moved into and out of engagement with the ground.

For causing rotation of the rod 55 and consequently causing raising and lowering of the shovel 48, a handle 56 is pivotally connected to the arm 32 by a pin 57. A tie rod 58 has one end connected to the handle 56, while the other end of the tie rod 58 is connected to a V-shaped plate 59, the plate 59 being secured to the rod 55. Thus, by moving the handle 56 manually from the position shown in Figure 5 to the position shown in Figure 6, the rod 55 will be rotated, whereby the shovel 48 will be moved to its raised position. The weight of the handle 56 is sufficient to maintain the shovel 48 in its raised or lifted position as shown in Figure 6. For limiting clockwise rotation of the rod 55, the end of the plate 59 is adapted to abut the bottom portion of the angle iron arm 32. For preventing the rod 55 from shifting from side to side, a pair of pins 60 project from the rod 55, and the pin 60 abuts the adjacent U-bolt 54. It is to be noted that one of the shovels 48 is arranged on the rear end of each of the sections 29 and 30, and also the previously-described actuating mechanism is provided for each shovel.

The rear ends of the sections 29 and 30 are detachably connected together, whereby the cultivator can be readily assembled and disassembled. Thus, a vertically-disposed end member 61, Figures 10 and 11, has its lower end secured to the bar 33, as by welding, and secured to the upper end of the end member 61 is a horizontally-disposed frame piece 62 which is provided with a longitudinal slot 63 therein. A similar frame piece projects from the other end member 61, and suitable securing elements, such as the bolt-and-nut assemblies 65, project through the registering slots 63 in the frame pieces 62 so as to maintain the sections in their assembled positions. Suitable braces 64 are provided for strengthening the rear end of the cultivator.

The cultivator frame 28 is adapted to be raised or lowered. Thus, the cultivator can be moved from the position shown in Figure 1 to the position shown in Figure 2, or vice versa, and for raising and lowering the cultivator, a hydraulically-operated means under the control of the tractor operator is provided. This hydraulic means includes a hollow cylinder 66 which has one end pivotally connected to the side member 22 by a pin 67. A suitable piston is slidably arranged in the cylinder 66, and a rod 68 is connected to the movable piston. An end piece 69 is secured to the rod 68, and the end piece 69 is provided with a slot 70 for a purpose to be later described. The hydraulic cylinder 66 is conventional and a suitable source of hydraulic fluid may be provided. A conduit 71 is connected to the supply pump of the tractor and is adapted to convey or transmit the hydraulic fluid from the source of supply. The conduit 71 is connected to a second conduit 72 which serves to convey the exhaust fluid back to the tractor reservoir tank, not shown.

For controlling the flow of fluid to and from the hydraulic cylinder 66, a manually-operable valve 74 is interposed between the conduit 71 and the conduit 72, Figures 1, 2, 3, 12, 13 and 14. The valve 74 includes a housing 75 and rotatably mounted in the housing 75 is a rotor 76, the rotor 76 being provided with a pair of arcuate passageways 77 and 78. A handle 79 is secured to the rotor 76 for rotating the latter. A first conduit 80 has one end communicating with the housing 75 and the other end of the flexible conduit 80 communicates with the upper end of the cylinder 66. A second flexible conduit 81 has one end also communicating with the interior of the housing 75, while the other end of the conduit 81 communicates with the lower end of the cylinder 66.

Arranged contiguous to the inner face of each of the gear boxes 26 is a bracket 83, the bracket 83 being secured to the box 26. Suitable bolts 85 connect a bearing block 84 to the bracket 83, there being a pair of the bearing blocks 84. A horizontally-disposed shaft 86 is rotatably supported by the pair of bearing blocks 84. A bolt-and-nut assembly 88 pivotally connects the upper end of a finger 87 to the end piece 69, the bolt 88 extending through the slot 70. The lower end of the finger 87 is secured to the shaft 86 so that as the rod 68 is moved back and forth in the cylinder 66, the shaft 86 will be caused to rotate.

Secured to each end of the shaft 86 is a rocker arm 89, so that as the shaft 86 rotates, the pair of rocker arms 89 rotate. A support member 92 is connected to each of the rocker arms 89 by suitable bolt-and-nut assemblies 90 and 91, and a pin 93 pivotally connects the rear end of the support member 92 to the upper end of a link 94. The lower end of the link 94 is pivotally connected to a lever 95 by a pin 96, the pin 96 extending through one of a plurality of holes 97 in the lever 95. The front end of the lever 95 is pivotally connected to the housing or gear box 26 by a pin 98.

The rear end of the lever 95 is pivotally connected to the lower end of a link 100 by a pin 99, while the upper end of the link 100 is pivotally connected to the rear end of a body member 101 by a pin 102. The front end of the body member 101 is pivotally connected to the rear end of a hanger member 104 by a bolt-and-nut assembly 103, the hanger member 104 being secured to the gear box 26 by suitable bolt-and-nut assemblies 105. The body member 101 includes a transverse portion or rod 106 that is pivotally connected to the arm 31 by a pin or bolt-and-nut assembly 107.

In use, with the cultivator of the present invention attached to the tractor 20, the cultivator is arranged in any desired position. Thus, as shown in Figure 1, the cultivator is in its lowered position, so that as the tractor travels along the field, the plows 34 and the sweep shovels 48 will cultivate the ground.

Then, to move the cultivator to its raised position, as shown in Figure 2, the tractor operator grips the valve handle 79 and moves the rotor 76 to the position as shown in Figure 13, whereby the passageway 77 will connect the conduit 73 to the conduit 81 and the passageway 78 will connect the conduit 71 to the conduit 80. Thus, hydraulic fluid will flow from the source of supply through the conduit 71, thence through the passageway 78, thence through the conduit 80 and into the upper end of the cylinder 66, so that the rod 68 will be retracted into the cylinder 66. After the rod 68 has been retracted, the desired amount, the rotor 76 can be moved to the position shown in Figure 12, so that the rod 68 will be held immobile and will not move accidentally. As the rod 68 moves into the cylinder 66, the finger 87 will be rotated in a clockwise direction to thereby rotate the shaft 86. Rotation of the shaft 86 causes rotation of the pair of rocker arms 89, and as the rocker arms 89 move, they carry therewith the support member 92. Movement of the support member 92 causes the link 94 to be lifted upwardly, and this results in the lever 95 pivoting about the pin 98. Since the link 100 connects the lever 95 to the body member 101, and since the rod 106 of the body member 101 is pivotally connected to the arms 31 of each of the sections 29 and 30, the sections 29 and 30 will be raised or lifted to the position shown in Figure 2.

Similarly, to move the cultivator from its raised position shown in Figure 2 to its lowered position, as shown in Figure 1, the rotor 76 is moved to the position shown in Figure 14, wherein hydraulic fluid will be conveyed to the front end of the cylinder 66 to thereby move the rod 68 out of the cylinder 66. By means of the previously-described link-and-lever arrangement, this outward movement of the rod 68 will permit the sections 29 and 30 to drop to their lowered position.

Further, the rear sweep shovels 48 can be raised and lowered independently, as desired. Thus, the user need only move the handle 56 to the position shown in Figure 5, when the cultivator is in its lowered position, in order to have the sweep shovels 48 engage the ground. To raise the sweep shovels 48, the user pivots the handle 56 from the position shown in Figure 5 to the position shown in Figure 6.

From the foregoing, it is apparent that a tractor cultivator has been provided which is simple to construct and connect to a tractor, and wherein the cultivator is capable of withstanding rough use. The cultivator plows are arranged or spaced so as to insure that there is sufficient clearance to permit trash to pass therebetween, and further, the number of plows can be varied as desired. Further, the pair of rear sweep shovels 48 can be raised and lowered independently of the plows 34, so as to avoid the necessity of running middles up twice. The major portions of the sections 29 and 30 can be made of any suitable material, such as angle iron. The slot 70 in the end piece 69 enables the cultivator to swing back and up in the event that the plows 34 hit a solid rock. Also, the cultivator can be quickly attached to the tractor. By being able to adjust the position of the cultivator, the device of the present invention can be used for various heights of ridges or rows.

What is claimed is:

1. The combination with a tractor including side members, a cylinder pivotally connected to one of said side members and adapted to be connected to a source of hydraulic fluid, a rod slidably arranged in said cylinder, a manually-operable valve for controlling the flow of hydraulic fluid to and from said cylinder, of a cultivator disposed below said tractor, said cultivator including a frame, said frame comprising a pair of sections, each of said sections comprising an arm, a brace arranged angularly with respect to said arm and having its front end secured thereto, a bar arranged at right angles with respect to the rear end of said brace and secured to said brace and to said arm, a plurality of spaced plows dependingly carried by said arm, a rod pivotally supported on said bar, a handle connected to said rod for pivoting the latter, a pair of sweep shovels carried by said rod and mounted for movement into and out of engagement with the ground, a plate secured to each of said side members, a link pivotally connecting the front of said arm to said plate, and means connecting said sections to said hydraulically-operated rod.

2. The apparatus as described in claim 1, wherein said last-named means comprises a bracket arranged contiguous to the inner surface of the tractor gear box and secured thereto, a bearing block secured to each of said brackets, a horizontally-disposed shaft carried by said bearing block, rocker arms mounted on each end of said shaft, a finger having one end secured to said shaft and its other end pivotally connected to said hydraulically-operated rod, a support member carried by each of said rocker arms, a rearwardly-extending lever having one end pivotally connected to the tractor gear box, a link having its upper end pivotally connected to said support member and its lower end pivotally connected to said lever, a horizontally-disposed hanger member secured to each of said gear boxes, a body member having its front end pivotally connected to the rear end of said hanger member, a link pivotally connecting the rear end of said body member to the rear end of said lever, said body member including a rod, said last-named rod having its lower end pivotally connected to the arms of said sections.

3. The combination with a tractor including side members, a cylinder pivotally connected to one of said side members and adapted to be connected to a source of hydraulic fluid, a rod slidably arranged in said cylinder, a manually operable valve for controlling the flow of hydraulic fluid to and from said cylinder, of a cultivator disposed below said tractor, said cultivator including a frame, said frame comprising a pair of sections, each of said sections comprising an arm, a brace arranged angularly with respect to said arm and having its front end secured thereto, a bar secured to said brace and to said arm, a plurality of plows dependingly carried by said arm, a rod pivotally supported on said bar, a handle connected to said rod for pivoting the latter, sweep shovels carried by said rod and mounted for movement into and out of engagement with the ground, a plate secured to each of said side members, a link pivotally connecting said arm to said plate, and means connecting said sections to said hydraulically operated rods.

WALLACE H. HENDRICK.

REFERENCES CITED

The following references are of record in the file of this patent:

UNITED STATES PATENTS

| Number | Name | Date |
|---|---|---|
| 1,760,336 | Benjamin | May 27, 1930 |
| 1,955,789 | Brown et al. | Apr. 24, 1934 |
| 2,086,350 | Brown | July 6, 1937 |
| 2,430,597 | Acton | Nov. 11, 1947 |